United States Patent [19]

Abe

[11] Patent Number: 5,282,089
[45] Date of Patent: Jan. 25, 1994

[54] ZOOM LENS SYSTEM

[75] Inventor: Tetsuya Abe, Hokkaido, Japan

[73] Assignee: Asahi Kogaku Kogyo K.K., Tokyo, Japan

[21] Appl. No.: 933,210

[22] Filed: Aug. 21, 1992

[30] Foreign Application Priority Data

Aug. 23, 1991 [JP] Japan ................... 3-212392

[51] Int. Cl.$^5$ ................................ G02B 15/14
[52] U.S. Cl. ................... 359/688; 359/684
[58] Field of Search .......... 359/676, 684, 686, 688

[56] References Cited

U.S. PATENT DOCUMENTS

| | | | |
|---|---|---|---|
| 4,518,228 | 5/1985 | Sugiura | 359/688 |
| 4,525,036 | 6/1985 | Fujibayashi et al. | 359/688 |
| 4,618,219 | 10/1986 | Sugiura et al. | 359/688 |
| 4,765,722 | 8/1988 | Aono | 359/688 |
| 5,146,366 | 9/1992 | Mukaiya | 359/683 |

Primary Examiner—Bruce Y. Arnold
Assistant Examiner—David R. Parsons
Attorney, Agent, or Firm—Sughrue, Mion, Zinn, Macpeak & Seas

[57] ABSTRACT

The improved zoom lens system includes, in order from the object side, a first lens group having a positive power, a second and a third lens group each having a negative power and a fourth lens group having an overall positive power, the fourth lens group being composed of a first sub-group 4a and a second sub-group 4b, which zoom lens system performs zooming by moving the second lens group relative to the overall system, the third lens group being moved relative to the overall system in operative association with the zooming so as to correct the shifting of the image plane due to the zooming which zoom lens system satisfies specific conditions.

2 Claims, 5 Drawing Sheets

ZOOM LENS SYSTEM

BACKGROUND OF THE INVENTION

This application is based on and claims priority from Japanese Patent Application No. HEI. 3-212392 filed Aug. 23, 1991, the disclosure of which is incorporated herein by reference.

This invention relates to an improvement of a zoom lens system for use with compact video cameras, etc.

The use of compact video cameras is constantly growing these days. Such compact video cameras are usually equipped with a lightweight and small-size zoom lens system of a "two-group" type which comprises, in order from the object side, the first lens group having a negative power and the second lens group having a positive power and which performs zooming by varying the distance between the two lens groups.

However, zoom lens systems of this "two-group" type are limited in zoom ratio and the maximum value cannot be increased beyond about 3. If one wants to meet the requirement of recent versions of compact video cameras for using a zoom lens system capable of achieving a higher zoom ratio, it is necessary to increase the power of each lens group; but then difficulty is involved in correcting aberrations such as spherical aberration and coma, making it impossible to achieve satisfactory optical performance.

SUMMARY OF THE INVENTION

The present invention has been accomplished under these circumstances and has as an object providing a compact zoom lens system that is of a four-group type, that is capable of achieving a high zoom ratio of up to about 10 that has brightness on the order of FNo. 1:1.2 to 1.7 at the wide-angle end and that exhibits satisfactory optical performance as a result of effective correction of various aberrations such as spherical aberration and coma.

This object of the present invention can be attained by a zoom lens system that comprises, in order from the object side, a first lens group having a positive power, a second and a third lens group each having a negative power and a fourth lens group having an overall positive power, said fourth lens group being composed of a first sub-group 4a and a second sub-group 4b, which zoom lens system performs zooming by moving said second lens group relative to the overall system, said third lens group being moved relative to said overall system in operative association with said zooming so as to correct the shifting of the image plane due to said zooming, which zoom lens system satisfies the following conditions (a) and (b):

$$0.2 \leq d/fw \leq 1.1 \tag{a}$$

$$0.2 \leq fw/f12 \leq 0.5 \tag{b}$$

where fw: the focal length of the overall system at the wide-angle end;
d: the distance between the first sub-group 4a and the second sub-group 4b; and
f12: the focal length, at the wide-angle end, of an optical system covering the first surface of the first lens group up to the second surface of the first sub-group 4a of the fourth lens group.

The first sub-group 4a and the second sub-group 4b of the fourth lens group are separate from each other at the position where a maximum air-space occurs within the fourth lens group.

More preferably, the first sub-group 4a comprises, in order from the object side, a biconvex lens element, a positive lens element that is convex toward the object, a negative lens element that is concave toward the object, and a positive lens element that is convex toward the object, whereas the second sub-group 4b comprises, in order from the object side, a negative-meniscus lens element that is convex toward the object and a lens unit having a positive power, said two sub-groups satisfying the following conditions (c), (d), (e), (f) and (g):

$$0.4 \leq fa/f1 \leq 1.0 \tag{c}$$

$$0 \leq fw/rb1 \leq 0.6 \tag{d}$$

$$-1.0 \leq ra2/ra1 \leq -0.2 \tag{e}$$

$$0.5 \leq ra4/ra5 \leq 8.0 \tag{f}$$

$$-0.8 \leq rb3/rb4 \leq 0 \tag{g}$$

where
fa: the focal length of the first sub-group 4a;
f1: the focal length of the first lens element in the first sub-group 4a;
rai: the radius of curvature of the i-th surface in the first sub-group 4a; and
rbi: the radius of curvature of the i-th surface in the second sub-group 4b.

DETAILED DESCRIPTION OF THE INVENTION

Figure 1:
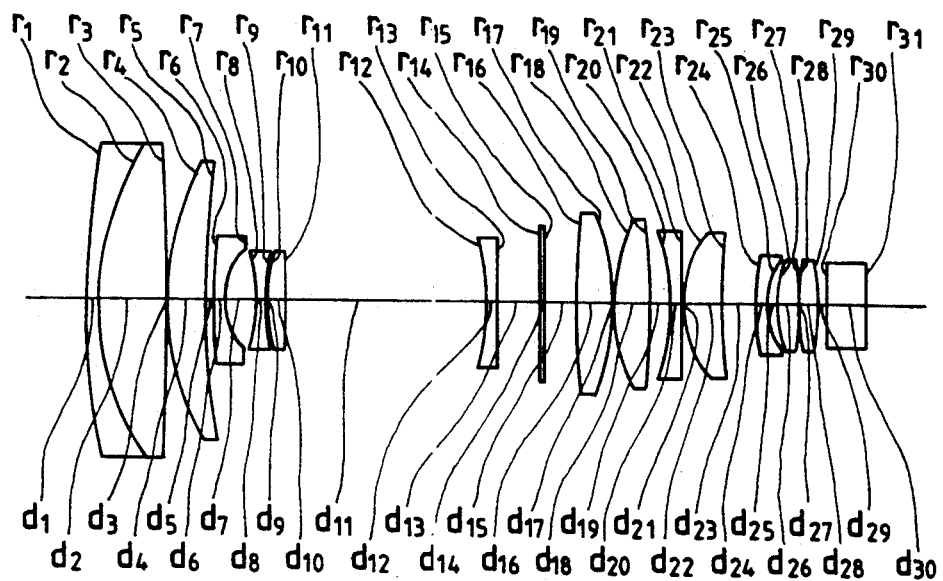
FIG. 1 is a simplified cross-sectional view showing the zoom lens system of Example 1 at the wide-angle end.

Examples of the zoom lens system of the present invention are described below with reference to the accompanying drawings.

The zoom lens system of the examples under consideration is of a four-group type that comprises, in order from the object side, the first lens group having a positive power, the second and the third lens group each having a negative power and the fourth lens group having an overall positive power; the fourth lens group is composed of the first sub-group 4a and the second sub-group 4b, the first sub-group 4a comprises, in order from the object side, a biconvex lens element, a positive lens element that is convex toward the object, a negative lens element that is concave toward the object, and a positive lens element that is convex toward the object, whereas the second sub-group 4b comprises, in order from the object side, a negative-meniscus lens element that is convex toward the object and a lens unit having a positive power. The first sub-group 4a and the second sub-group 4b of the fourth lens group are separate from each other at the position where a maximum air-space occurs within the fourth lens group. This lens system satisfies the following conditions (a) and (b):

$$0.2 \leq d/fw \leq 1.1 \quad (a)$$

$$0.2 \leq fw/f12 \leq 0.5 \quad (b)$$

where fw: the focal length of the overall system at the wide-angle end;
f12: the focal length, at the wide-angle end, of an optical system covering the first surface of the first lens group up to the second surface of the first sub-group of the fourth lens group; and
d: the distance between the sub-groups 4a and 4b which are separate from each other at the position where a maximum airspace occurs within the fourth lens group.

Condition (a) should be satisfied in order to insure that the first and second sub-groups 4a and 4b are kept apart by an appropriate distance so that the overall lens system will maintain satisfactory optical performance even if its overall length is shortened. If the lower limit of this condition is not reached, the light beam issuing the first sub-group 4a is focused so strongly that an excessive negative spherical aberration will develop. If the upper limit of condition (a) is exceeded, the overall length of the zoom lens system becomes excessive.

Condition (b) should be satisfied in order to shorten the overall length of the zoom lens system by increasing the focusing action of the first lens element in the first sub-group 4a of the fourth lens group. If the lower limit of this condition is not reached, the beam focusing by the first lens in the first sub-group is so strong that an excessive negative spherical aberration will develop. If the upper limit of condition (a) is exceeded, the focusing action of said first lens is too weak to shorten the overall length of the zoom lens system.

Preferably the zoom lens system under discussion further satisfies the following conditions (c), (d), (e), (f) and (g):

$$0.4 \leq fa/f1 \leq 1.0 \quad (c)$$

$$0 \leq fw/rb1 \leq 0.6 \quad (d)$$

$$-1.0 \leq ra2/ra1 \leq -0.2 \quad (e)$$

$$0.5 \leq ra4/ra5 \leq 8.0 \quad (f)$$

$$-0.8 \leq rb3/rb4 \leq 0 \quad (g)$$

where fw: the focal length of the overall system at the wide-angle end;

fa: the focal length of the first sub-group 4a of the fourth lens group;
f1: the focal length of the first lens element in the first sub-group 4a;
rai: the radius of curvature of the i-th surface in the first sub-group 4a; and
rbi: the radius of curvature of the i-th surface in the second sub-group 4b.

Condition (c) should be satisfied in order to achieve satisfactory optical performance with the overall lens system by imparting appropriate power to the, first lens element in the first sub-group 4a of the fourth lens group, the focusing action of said first lens element being specified by condition (b). If the lower limit of condition (c) is not reached, the power of said first lens element is too weak to produce the necessary focusing action. If the upper limit of this condition is exceeded, the power of said first lens element is so strong that an excessive negative spherical aberration will develop.

Condition (d) should be satisfied in order to achieve satisfactory optical performance with the zoom lens system by appropriately setting the radius of curvature of the first surface in the second sub-group 4b of the fourth lens group. This condition is necessary because the light beam issuing from the first sub-group 4a of the fourth lens group has been subjected to a strong focusing action. If the lower limit of this condition is not met, the divergence at the first surface in the second sub-group 4b is so strong that an excessive positive spherical aberration will develop. If the upper limit of condition (d) is exceeded, the convergence at said first surface is so strong that an excessive negative spherical aberration will develop.

Condition (e) should be satisfied in order to achieve satisfactory optical performance with the zoom lens system by imparting an appropriate surface geometry to the first lens element in the first sub-group 4a which is specified for power by condition (c). If the lower limit of this condition is not reached, an excessive negative spherical aberration will develop. If the upper limit of condition (e) is exceeded, an excessive positive spherical aberration will develop.

Condition (f) should be satisfied in order to achieve satisfactory optical performance with the zoom lens system by imparting an appropriate surface geometry not only to the exit face of the second lens element in the first sub-group 4a which has a strong focusing action but also to the entrance face of the third lens element in the first sub-group 4a which has a strong diverging action. If the lower limit of this condition is not reached, the diverging action of the entrance face of the third lens element is so weak that a negative spherical aberration and coma will develop excessively. If the upper limit of condition (f) is exceeded, the diverging action of the entrance face of the third lens element is so strong that a positive spherical aberration and coma will develop excessively.

Condition (g) should be satisfied in order to achieve satisfactory optical performance with the zoom lens system by imparting an appropriate geometry to the positive lens unit in the second sub-group 4b which has a strong focusing action. If the lower limit of this condition is not reached, an excessive negative spherical aberration will develop. If the upper limit of condition (g) is exceeded, an excessive positive spherical aberration will develop.

Three specific examples of the zoom lens system of the present invention are described below with reference to numerical data sheets, in which f denotes the focal length (mm), e, the half view angle (degree), fB, the back focus (mm), r, the radius of curvature of an individual lens surface (mm), d, the lens thickness or the airspace between lens surface (mm), n, the refractive index of an individual lens at the d-line, and v, the Abbe number of an individual lens.

EXAMPLE 1

Figure 2:
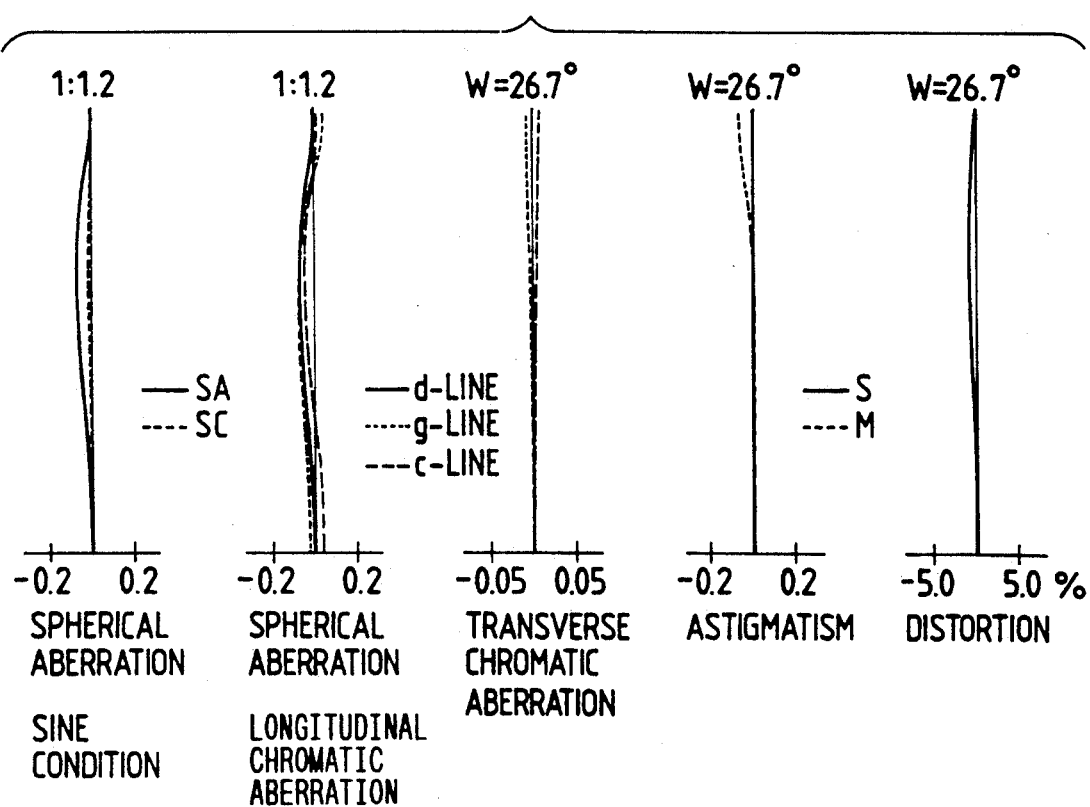
FIG. 2 is a set of graphs plotting the aberration curves obtained with the zoom lens system of Example 1 at the wide-angle end.
Figure 3:
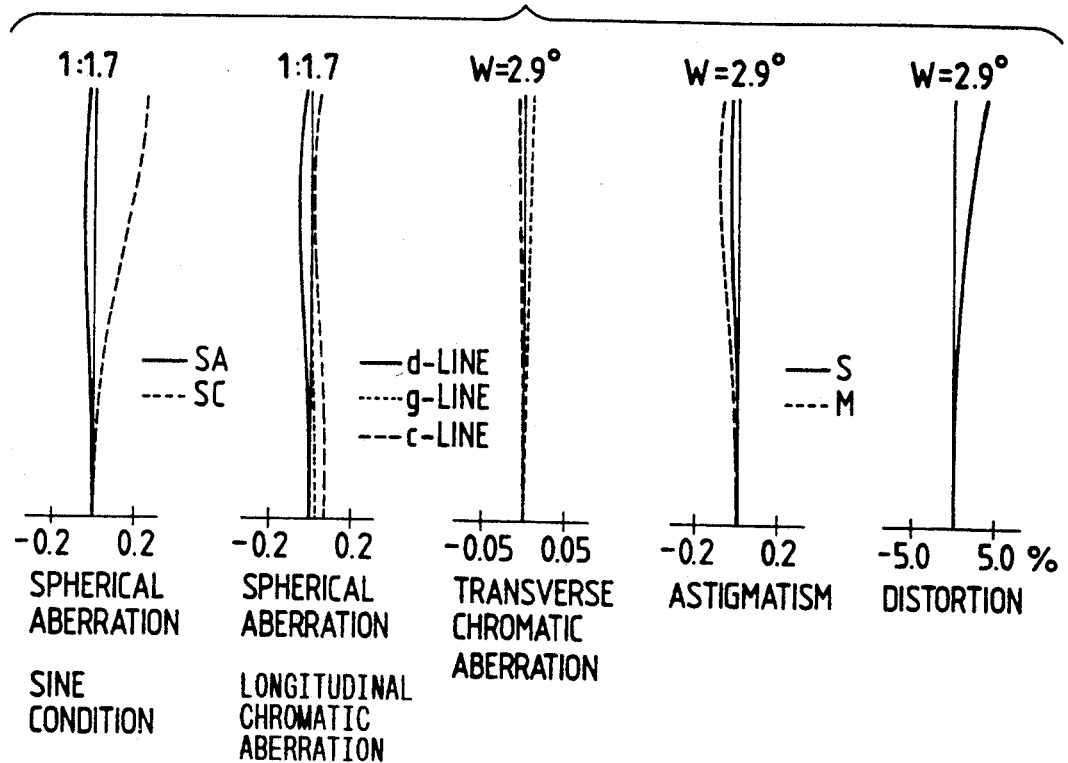
FIG. 3 is a set of graphs plotting the aberration curves obtained with the zoom lens system of Example 1 at the telephoto end.

FIG. 1 is a simplified cross-sectional view showing the zoom lens system of Example 1. Specific data for this lens system are given in Table 1 below. Graphs plotting the aberration curves obtained with this lens system at the wide-angle and telephoto ends are shown in FIGS. 2 and 3, respectively.

TABLE 1

FNo. = 1:1.2–1.7, f = 5.97–56.30
ω = 26.7–2.9, fB = 4.90

| Surface No. | f | d | n | v |
|---|---|---|---|---|
| 1 | 73.562 | 1.50 | 1.80518 | 25.4 |
| 2 | 30.517 | 8.02 | 1.62041 | 60.3 |
| 3 | −451.012 | 0.10 | | |
| 4 | 30.134 | 4.58 | 1.77250 | 49.6 |
| 5 | 98.137 | variable | | |
| 6 | 52.445 | 1.20 | 1.80400 | 46.6 |
| 7 | 7.519 | 3.85 | | |
| 8 | −16.739 | 1.20 | 1.77250 | 49.6 |
| 9 | 37.727 | 0.10 | | |
| 10 | 18.980 | 2.08 | 1.84666 | 23.9 |
| 11 | −80.922 | variable | | |
| 12 | −23.300 | 1.20 | 1.69680 | 55.5 |
| 13 | −382.905 | variable | | |
| 14 | ∞ | 0.50 | 1.51633 | 64.1 |
| 15 | ∞ | 3.80 | | |
| 16 | 78.000 | 4.36 | 1.77250 | 49.6 |
| 17 | −23.725 | 0.10 | | |
| 18 | 20.382 | 4.39 | 1.51633 | 64.1 |
| 19 | −65.000 | 2.49 | | |
| 20 | −20.650 | 1.20 | 1.84666 | 23.9 |
| 21 | ∞ | 0.10 | | |
| 22 | 11.652 | 4.64 | 1.51633 | 64.1 |
| 23 | 102.957 | 3.93 | | |
| 24 | 29.210 | 1.20 | 1.83400 | 37.2 |
| 25 | 7.600 | 1.33 | | |
| 26 | 15.243 | 2.31 | 1.51633 | 64.1 |
| 27 | −44.700 | 0.10 | | |
| 28 | 24.854 | 2.05 | 1.51633 | 64.1 |
| 29 | −29.920 | 1.00 | | |
| 30 | ∞ | 4.70 | 1.49782 | 66.8 |
| 31 | ∞ | | | |

The values of d5, d11 and d13 will vary as follows.

| FNo. | 1.2 | 1.7 |
|---|---|---|
| f | 5.97 | 56.30 |
| ω | 26.7 | 2.9 |
| d5 | 0.86 | 24.08 |
| d11 | 23.25 | 4.20 |
| d13 | 4.96 | 0.79 |

EXAMPLE 2

Figure 4:
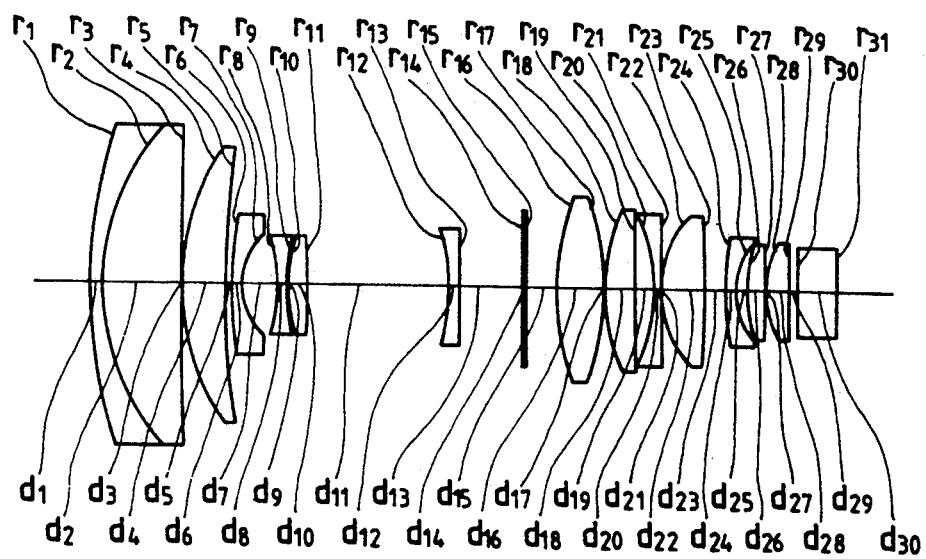
FIG. 4 is a simplified cross-sectional view showing the zoom lens system of Example 2 at the wide-angle end.
Figure 5:
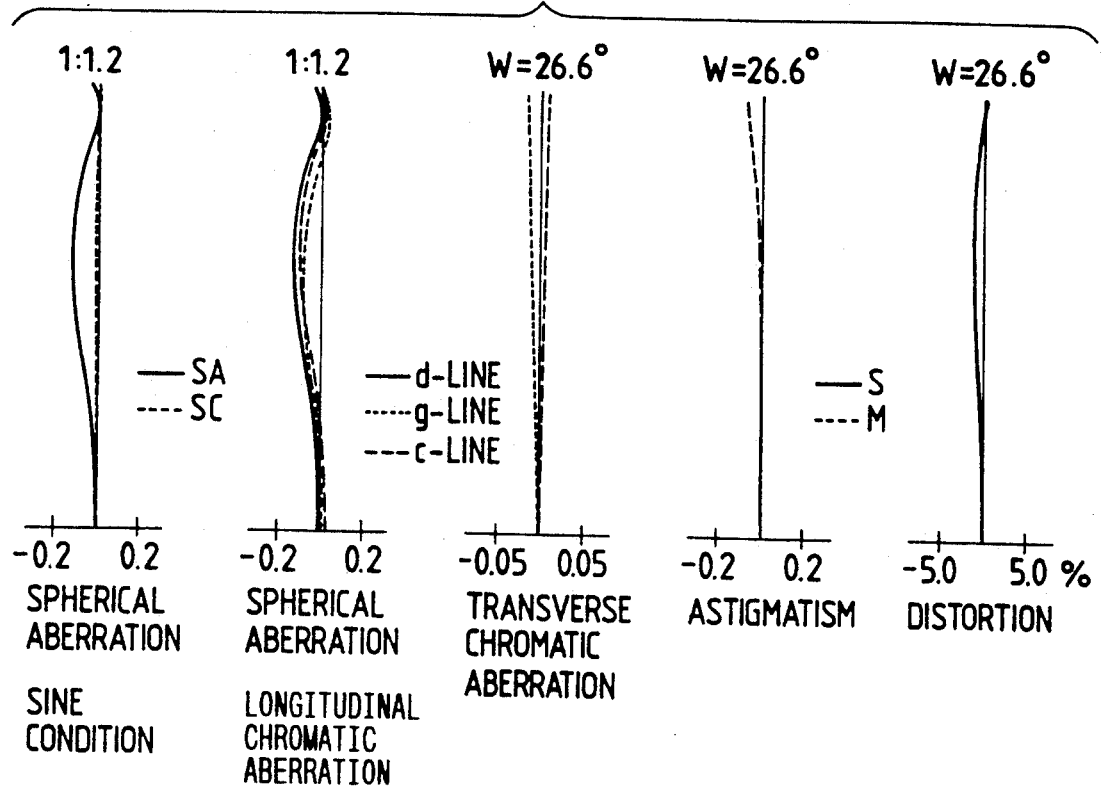
FIG. 5 is a set of graphs plotting the aberration curves obtained with the zoom lens system of Example 2 at the wide-angle end.
Figure 6:
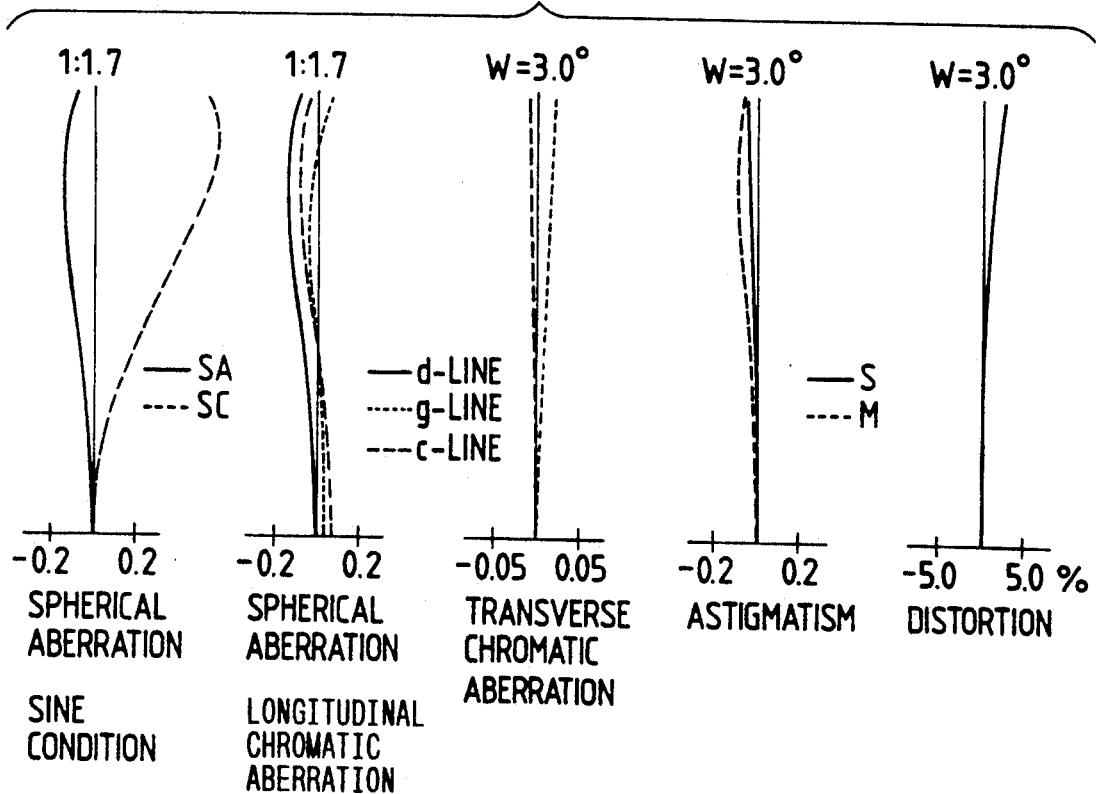
FIG. 6 is a set of graphs plotting the aberration curves obtained with the zoom lens system of Example 2 at the telephoto end.

FIG. 4 is a simplified cross-sectional view showing the zoom lens system of Example 2. Specific data for this lens system are given in Table 2 below. Graphs plotting the aberration curves obtained with this lens system at the wide-angle and telephoto ends are shown in FIGS. 5 and 6, respectively.

TABLE 2

FNo. = 1:1.2–1.7, f = 5.97–56.30
ω = 26.6–3.0, fB = 5.12

| Surface No. | f | d | n | v |
|---|---|---|---|---|
| 1 | 54.276 | 1.50 | 1.80518 | 25.4 |
| 2 | 25.791 | 9.70 | 1.60311 | 60.7 |
| 3 | ∞ | 0.10 | | |
| 4 | 26.671 | 5.00 | 1.77250 | 49.6 |
| 5 | 95.465 | variable | | |
| 6 | 47.529 | 1.20 | 1.80400 | 46.6 |
| 7 | 7.254 | 4.30 | | |
| 8 | −17.826 | 1.20 | 1.77250 | 49.6 |
| 9 | 26.926 | 0.10 | | |
| 10 | 17.025 | 2.20 | 1.84666 | 23.9 |
| 11 | −91.044 | variable | | |
| 12 | −19.197 | 1.20 | 1.69680 | 55.5 |
| 13 | ∞ | variable | | |
| 14 | ∞ | 0.50 | 1.51633 | 64.1 |
| 15 | ∞ | 3.80 | | |
| 16 | 27.652 | 5.80 | 1.65844 | 50.9 |
| 17 | −24.904 | 0.10 | | |
| 18 | 20.248 | 4.00 | 1.51633 | 64.1 |
| 19 | −99.164 | 1.75 | | |
| 20 | −18.242 | 1.20 | 1.84666 | 23.9 |
| 21 | ∞ | 0.10 | | |
| 22 | 12.195 | 5.10 | 1.51633 | 64.1 |
| 23 | −97.894 | 2.57 | | |
| 24 | 40.709 | 1.20 | 1.78590 | 44.2 |
| 25 | 7.554 | 1.40 | | |
| 26 | 15.613 | 2.20 | 1.48749 | 70.2 |
| 27 | −104.358 | 0.10 | | |
| 28 | 10.405 | 2.80 | 1.48749 | 70.2 |
| 29 | ∞ | 1.00 | | |
| 30 | ∞ | 4.70 | 1.49782 | 66.8 |
| 31 | ∞ | | | |

The values of d5, d11 and d15 will vary as follows.

| FNo. | 1.2 | 1.7 |
|---|---|---|
| f | 5.97 | 56.30 |
| ω | 26.6 | 3.0 |
| d5 | 0.80 | 19.39 |
| d11 | 16.84 | 4.87 |
| d13 | 7.42 | 0.80 |

EXAMPLE 3

Figure 7:
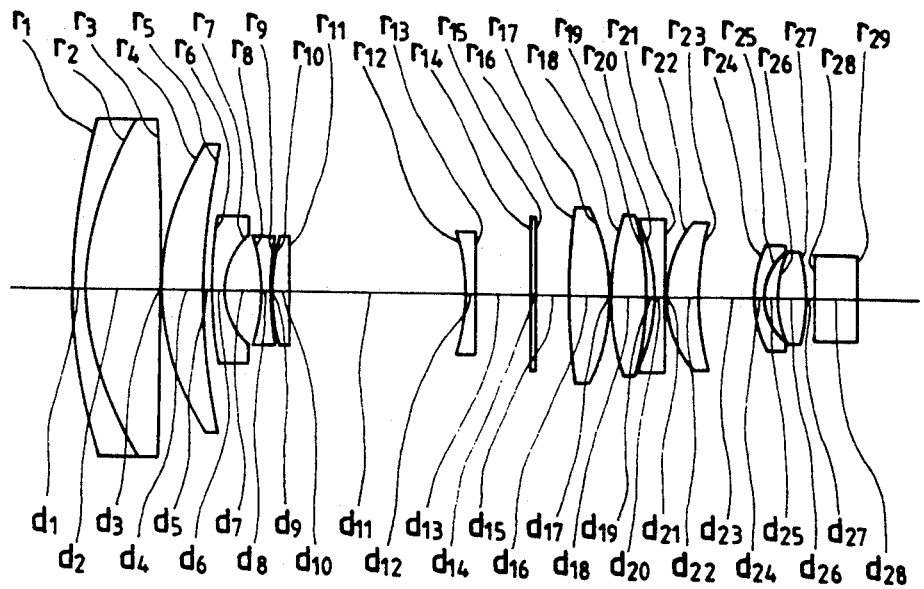
FIG. 7 is a simplified cross-sectional view showing the zoom lens system of Example 3 at the wide-angle end.
Figure 8:
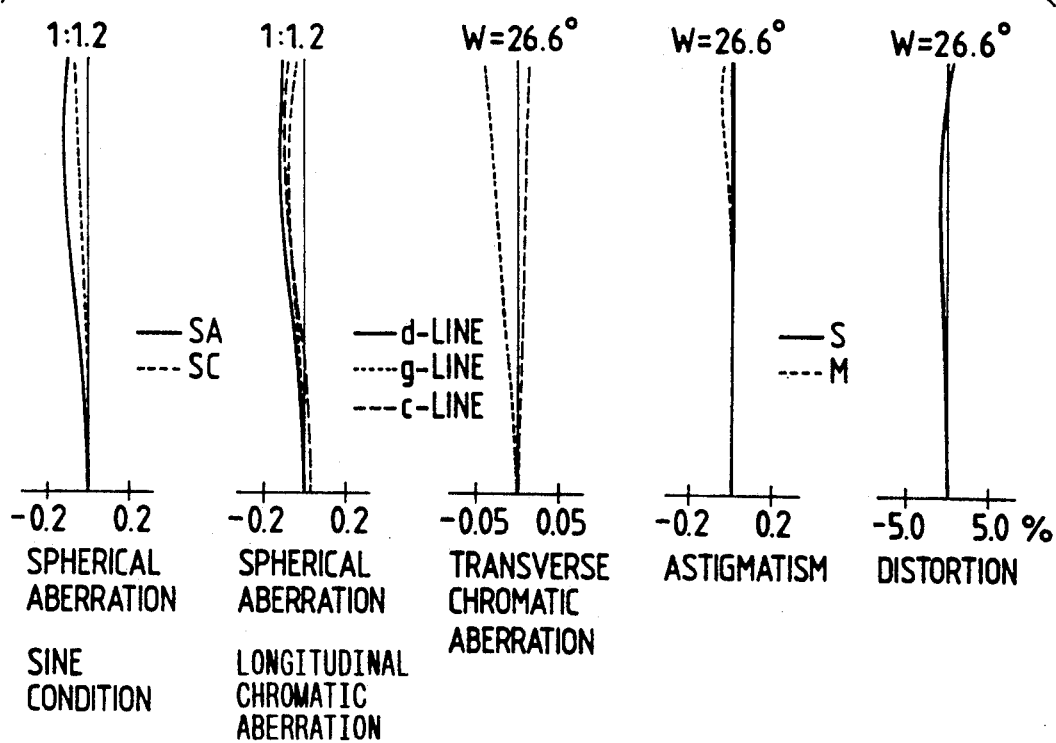
FIG. 8 is a set of graphs plotting the aberration curves obtained with the zoom lens system of Example 3 at the wide-angle end.
Figure 9:
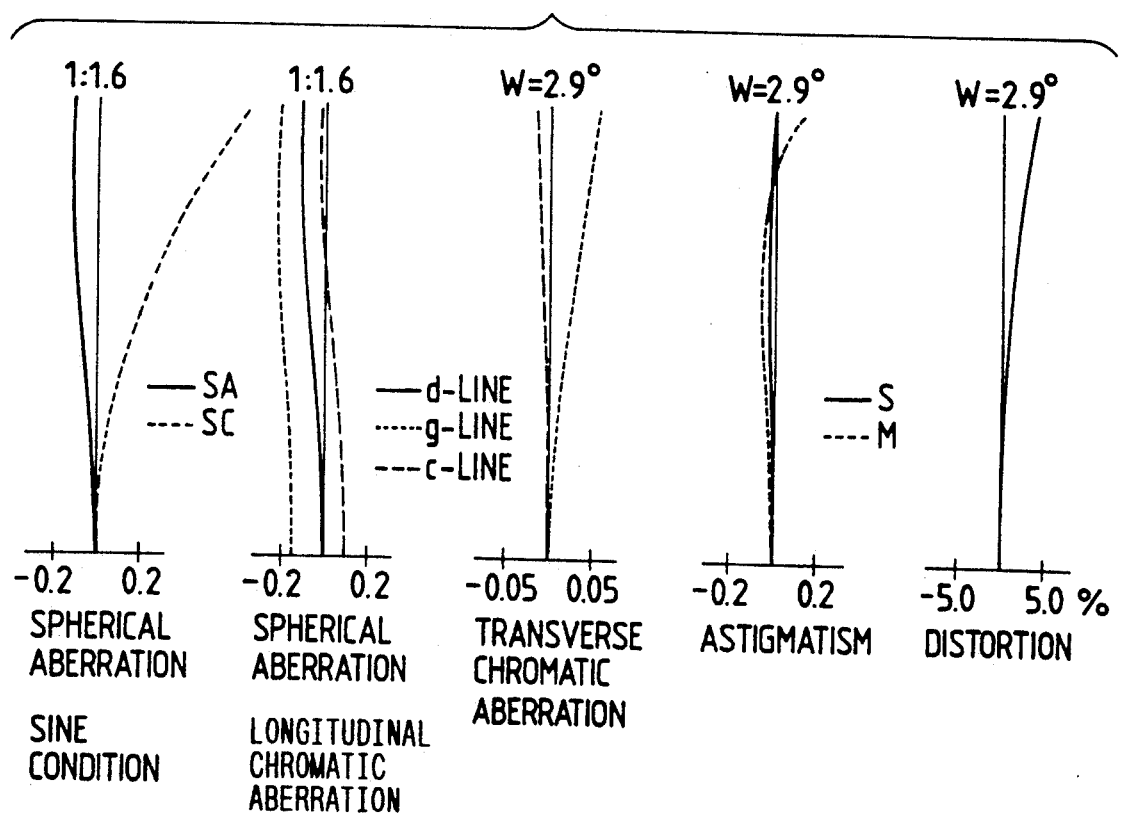
FIG. 9 is a set of graphs plotting the aberration curves obtained with the zoom lens system of Example 3 at the telephoto end.

FIG. 7 is a simplified cross-sectional view showing the zoom lens system of Example 3. Specific data for this lens system are given in Table 3 below. Graphs plotting the aberration curves obtained with this lens system at the wide-angle and telephoto ends are shown in FIGS. 8 and 9, respectively.

TABLE 3

FNo. = 1:1.2–1.6, f = 5.97–56.30
ω = 26.6–2.9, fB = 4.90

| Surface No. | f | d | n | v |
|---|---|---|---|---|
| 1 | 58.714 | 1.50 | 1.80518 | 25.4 |
| 2 | 31.885 | 8.33 | 1.62299 | 58.1 |
| 3 | −561.306 | 0.10 | | |
| 4 | 27.060 | 4.71 | 1.71300 | 53.8 |
| 5 | 70.565 | variable | | |
| 6 | 56.910 | 1.20 | 1.80400 | 46.6 |
| 7 | 7.862 | 4.14 | | |
| 8 | −19.904 | 1.20 | 1.77250 | 49.6 |
| 9 | 56.474 | 0.10 | | |
| 10 | 19.708 | 1.85 | 1.84666 | 23.9 |
| 11 | 147.316 | variable | | |
| 12 | −22.490 | 1.20 | 1.69680 | 55.5 |
| 13 | −8188.535 | variable | | |
| 14 | ∞ | 0.50 | 1.51633 | 64.1 |
| 15 | ∞ | 3.80 | | |
| 16 | 57.932 | 4.70 | 1.69680 | 55.5 |
| 17 | −19.997 | 0.10 | | |
| 18 | 25.080 | 4.01 | 1.53172 | 48.9 |

TABLE 3-continued

FNo. = 1:1.2–1.6, f = 5.97–56.30
ω = 26.6–2.9, fB = 4.90

| Surface No. | f | d | n | ν |
|---|---|---|---|---|
| 19 | −34.292 | 0.96 | | |
| 20 | −19.041 | 1.20 | 1.84666 | 23.9 |
| 21 | 512.251 | 0.10 | | |
| 22 | 11.544 | 4.01 | 1.48749 | 70.2 |
| 23 | 34.250 | 6.13 | | |
| 24 | 12.509 | 1.20 | 1.69680 | 55.5 |
| 25 | 6.594 | 1.40 | | |
| 26 | 10.893 | 3.10 | 1.48749 | 70.2 |
| 27 | −22.129 | 1.00 | | |
| 28 | ∞ | 4.70 | 1.49782 | 66.8 |
| 29 | ∞ | | | |

The values of d5, d11 and d13 will vary as follows.

| FNo. | 1.2 | 1.6 |
|---|---|---|
| f | 5.97 | 56.30 |
| ω | 26.6 | 2.9 |
| d5 | 1.04 | 21.42 |
| d11 | 19.91 | 5.15 |
| d13 | 6.41 | 0.80 |

Conditions (a) to (g) are satisfied in each of Examples 1 to 3 as set forth in Table 4 below.

TABLE 4

| Condition | Example 1 | Example 2 | Example 3 |
|---|---|---|---|
| d/fw | 0.687 | 0.430 | 1.026 |
| fw/f12 | 0.243 | 0.351 | 0.321 |
| fa/fl | 0.585 | 0.661 | 0.679 |
| fw/rb1 | 0.205 | 0.147 | 0.477 |
| fa2/ra1 | −0.304 | −0.901 | −0.345 |
| ra4/ra5 | 3.148 | 5.436 | 1.801 |
| rb3/rb4 | −0.341 | −0.150 | −0.492 |

As described on the foregoing pages, the present invention offers a compact zoom lens system of a four-group type that is capable of achieving a high zoom ratio of up to about 10, that has brightness on the order of FNo. 1:1.2 to 1.7 at the wide-angle end and that is capable of effective correction of various aberrations such as spherical aberration and coma.

What is claimed is

1. A zoom lens system that comprises, in order from the object side, a first lens group having a positive power, a second lens group and a third lens group each having a negative power and a fourth lens group having an overall positive power, said fourth lens group being composed of a first sub-group and a second sub-group, wherein said zoom lens system performs zooming by moving said second lens group relative to the overall system, said third lens group being movable relative to said overall system in operative association with said zooming so as to correct the shifting of the image plane due to said zooming, said zoom lens system satisfying the following conditions (a) and (b):

$$0.2 \leq d/fw \leq 1.1 \qquad (a)$$

$$0.2 \leq fw/f12 \leq 0.5 \qquad (b)$$

where fw: the focal length of the overall system at the wide-angle end;
d: the distance between the first sub-group and the second sub-group which are separate from each other at the position where a maximum airspace occurs within the fourth lens group; and
f12: the focal length, at the wide-angle end, of an optical system covering the first surface of the first lens group up to the second surface of the first sub-group of the fourth lens group.

2. A zoom lens system according to claim 1, wherein said first sub-group comprises, in order from the object side, a biconvex lens element, a positive lens element that is convex toward the object, a negative lens element that is concave toward the object and a positive lens element that is convex toward the object, and wherein said second sub-group comprises, in order from the object side, a negative meniscus lens element that is convex toward the object and a lens unit having a positive power, said first and second sub-groups satisfying the following conditions (c), (d), (e), (f) and (g):

$$0.4 \leq fa/fl \leq 1.0 \qquad (c)$$

$$0 \leq fw/rb1 \leq 0.6 \qquad (d)$$

$$-1.0 \leq ra2/ra1 \leq -0.2 \qquad (e)$$

$$0.5 \leq ra4/ra5 \leq 8.0 \qquad (f)$$

$$-0.8 \leq rb3/rb4 \leq 0 \qquad (g)$$

where
fa: the focal length of the first sub-group;
fl: the focal length of the first lens element in the first sub-group;
rai: the radius of curvature of the i-th surface in the first sub-group; and
rbi: the radius of curvature of the i-th surface in the second sub-group.

* * * * *